Sept. 7, 1937.  D. M. MORRIS  2,092,610
TRACTOR HITCH ATTACHMENT
Filed Nov. 14, 1935  4 Sheets-Sheet 1
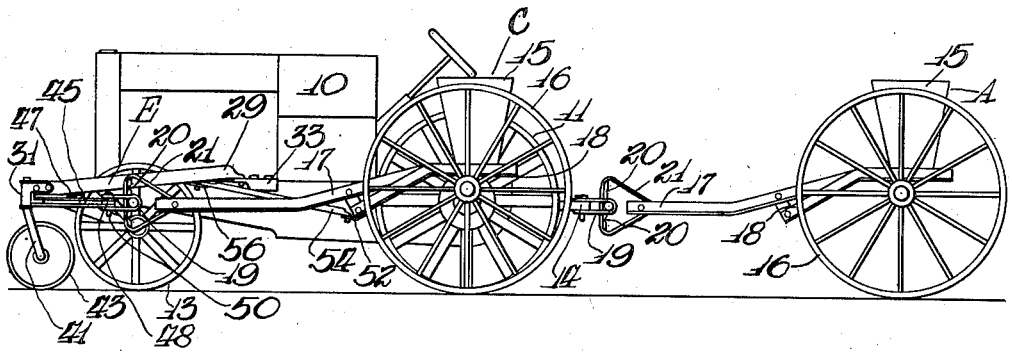
Inventor
David M. Morris

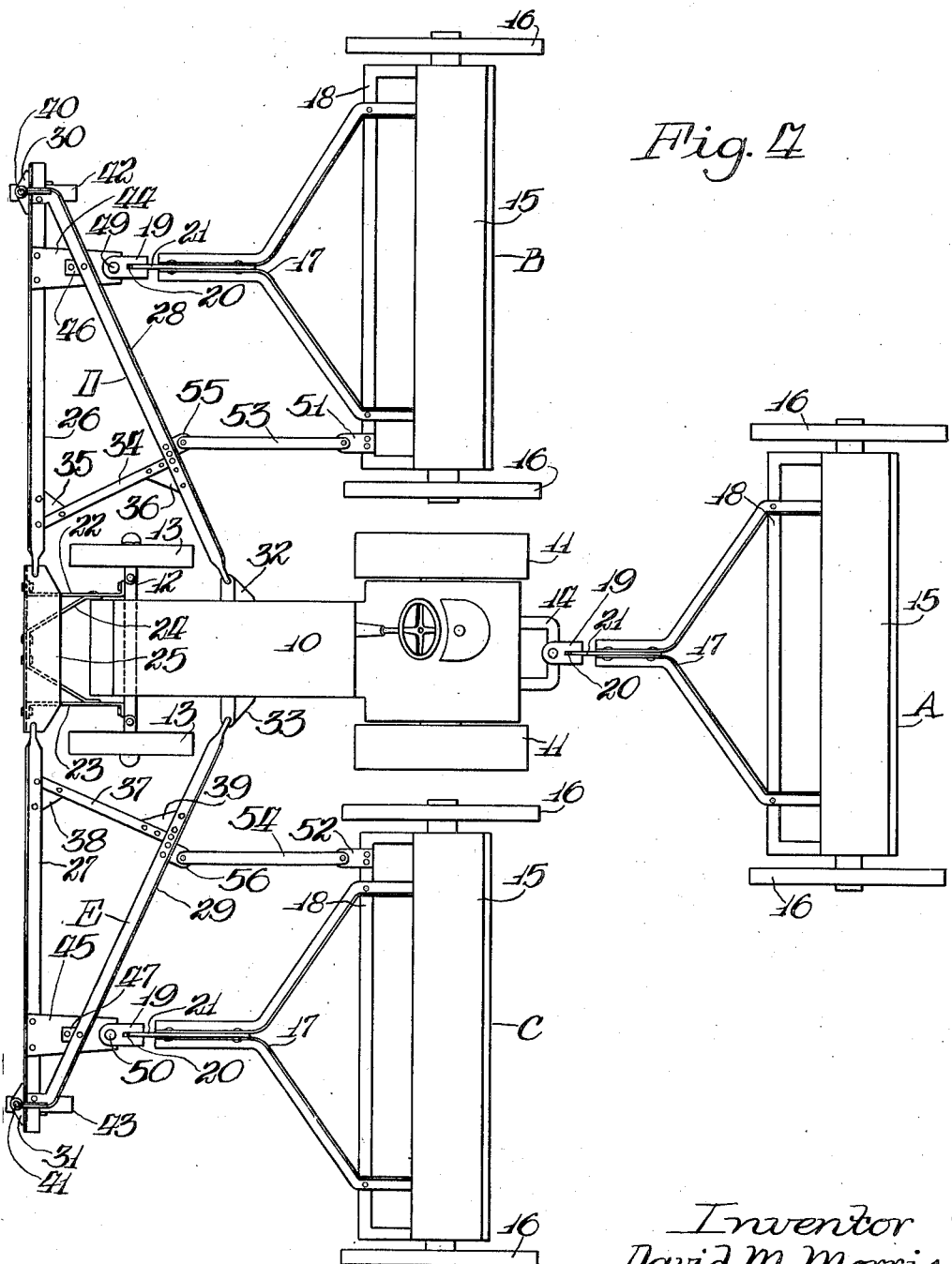

Sept. 7, 1937.   D. M. MORRIS   2,092,610
TRACTOR HITCH ATTACHMENT
Filed Nov. 14, 1935   4 Sheets-Sheet 4

Inventor
David M. Morris
By V. T. Lavagne
Att'y.

Patented Sept. 7, 1937

2,092,610

UNITED STATES PATENT OFFICE 2,092,610

TRACTOR HITCH ATTACHMENT

David M. Morris, Richmond, Ind., assignor to International Harvester Company, a corporation of New Jersey Application November 14, 1935, Serial No. 49,771

9 Claims. (Cl. 97—47)

The present invention relates to hitch attachments for tractors, and more particularly to grain drill attachments in the nature of a triple hitch mounted on the tractor.

The main object of the invention is to provide a simple form of hitch attachment and locate it on the tractor so that implements, such as grain drills, may be readily connected and disconnected therefrom and also to provide a hitch attachment that may be readily attached to the conventional forms of tractors, such as the usual four-wheel type, the tricycle type, and crawler type of tractor, without altering the tractor in any manner.

Another object of the invention is to locate the hitch so that the wheels of the two wing drills or side drills have their main axles substantially coinciding and parallel with the main axle of the tractor to improve the steering of the tractor. As the two wing drills are lined up with the tractor wheels, they apparently, on a short turn, assist the tractor in turning with greater facility and avoid drift.

Another object of the invention is to provide a tractor hitch so that the side implements are so placed relative to the tractor that the main axle of the tractor is substantially in line with the implements and that the implements are flexibly attached and rigidly positioned with respect to the tractor.

Another object of the invention is to trail behind the tractor a grain drill so positioned that with the side drills positioned laterally of the tractor a continuous seed bed will be drilled or broadcast between the outermost ends of the laterally positioned grain drills.

Another object of the invention is to position the grain drills so that they may be readily operated from the tractor.

The foregoing, as well as other objects, which will appear from the description to follow, are attained by the construction and arrangements of the parts hereinafter disclosed and claimed, and illustrated by the accompanying drawings, wherein:

Figure 1 is a side elevation of the hitch attachment for the grain drills connected to a tractor of the conventional four-wheel type;

Figure 2 is a side elevation of the hitch attachment for the grain drills connected to a tractor of the tricycle type;

Figure 3 is a side elevation of the hitch attachment connected to a crawler type of tractor;

Figure 4 is a plan view of the triple hitch attachment for grain drills and the tractor as shown in Figure 1;

Figure 5:
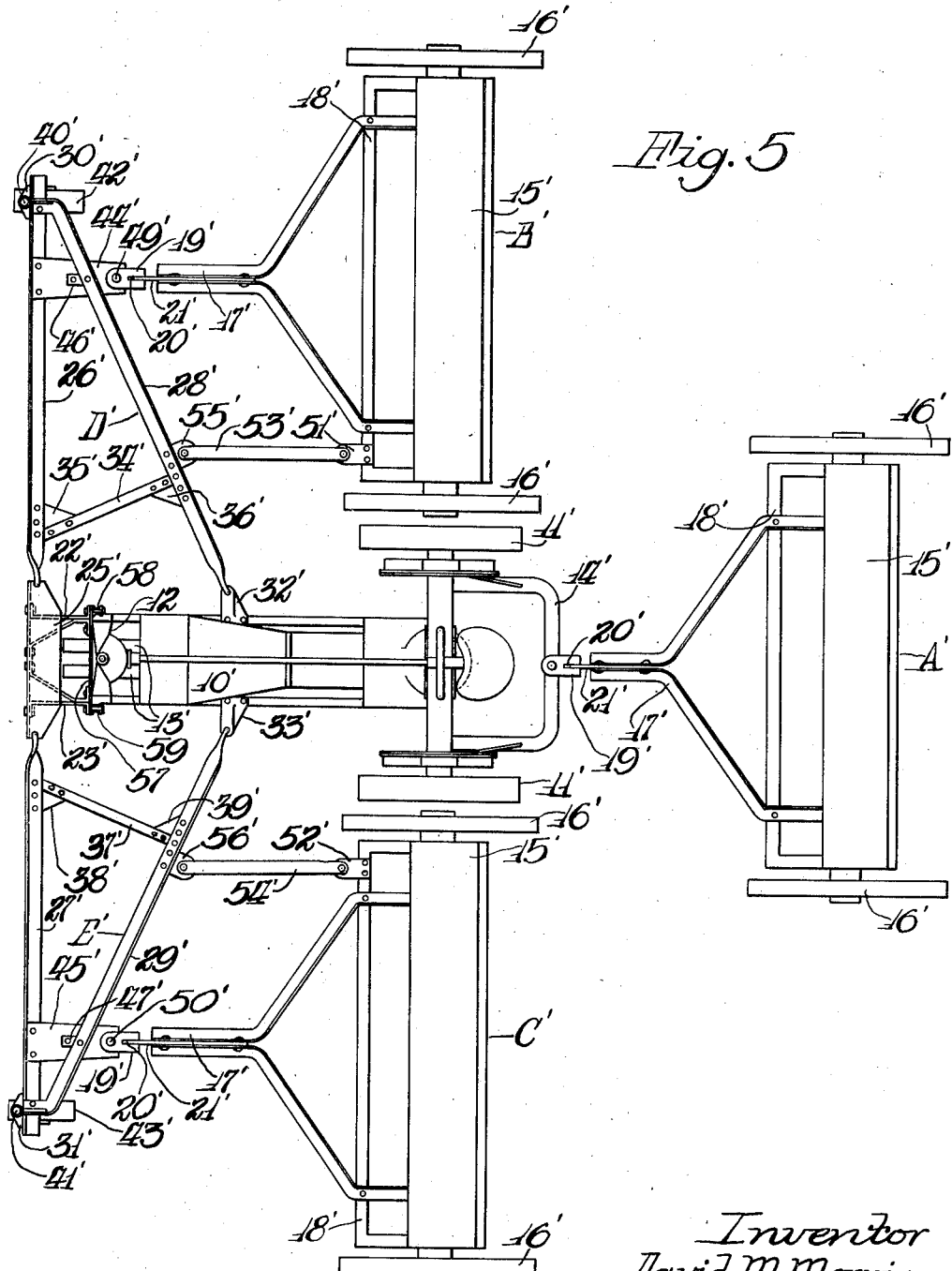
Figure 5 is a plan view of the triple hitch attachment for grain drills and the tractor as shown in Figure 2; and, Figure 6 is a plan view of the triple hitch attachment and the tractor as shown in Figure 3.

In the construction illustrated in Figures 1 and 4, the tractor 10, having the usual operator's station and steering wheel and also having the rear wheels 11 and the front steering truck 12 with the front steering wheels 13, has connected at the rear, the draw-bar 14 to which is connected the grain drill A having the seed box 15 similar in construction to the grain drill disclosed in the patent to S. W. Cady No. 1,533,059 granted April 7, 1925, and is shown here conventionally having the front tractor hitch 17 secured to the frame 18. The tractor hitch 17 is connected to the draw-bar 14 by the clevis 19. The grain drill 15, as shown in Figure 1, may have a clevis 19 adjusted vertically on the hitch attachment 17 of the grain drill by adjusting it vertically in the notches 20 of the draft member 21. Similarly placed to the right and left of the tractor are similar grain drills B and C. Like reference characters describe the grain drills B and C as used for the grain drill A. The grain drills B and C have the center line of the wheels 16 in the same plane as the center line of the tractor wheels 11. Forwardly connected to the front steering truck 12 are the forwardly extending supporting members 22 and 23 laterally spaced and securely braced by the brace member 24. Secured to the members 22, 23, and 24 is the draft member 25. Attached laterally on either side of the tractor 10 are the hitch attachments D and E. The hitch attachments D and E are in the nature of A-frames pivotally connected to the tractor and having a swivelly mounted forecarriage wheel at the apex of the frame. The A-frames D and E are similar in construction, but are of opposite hands. The A-frames D and E have laterally extending draft members 26 and 27 pivotally connected at their inner ends through the draft member 25. The rear legs 28 and 29 of the A-frame forming compression members are rigidly connected at their outer ends to form the apex of the A-frame by the forecarriage swivel brackets 30 and 31, which secure the members 27 and 29 and 26 and 28 at their outer ends. The members 28 and 29 are loosely connected at their inner ends to the brackets 32 and 33, which are secured to the frame of the tractor. The connections on the draft member 25 and the brackets 32 and 33 provide means for the transversely extending means 26, 27, 28 and 29 to be attached to, or detached from the vehicle. The members 26 and 28 are braced by the member 34, which is secured at its forward end by the gusset plate 35 to the member 26, and at its rear end by the gusset plate 36 to the member 28. Likewise, the members 27 and 29 are braced apart by the member 37, which is secured at its forward end to the member 27 by the gusset plate 38, and likewise the member 37 is secured to the member 29 by the gusset plate 39. Swivelly mounted in the brackets 30 and 31 are the forecarriage wheel standards 40 and 41 on which are journaled, respectively, the forecarriage wheels 42 and 43. Secured laterally on the hitch attachments D and E are the draft members 44 and 45, which are secured at their front end to the members 26 and 27 and at their mid-portion to the members 28 and 29 by the braces 46 and 47. The members 44 and 45 are formed from two similar members vertically spaced by the spacing block 48 to which the clevis 19 of the grain drills B and C are secured by the removable draft pins 49 and 50.

Inwardly secured on the frames 18 of the grain drills B and C are the additional draft brackets 51 and 52, to which are flexibly mounted the connecting links 53 and 54, respectively, which are flexibly connected at their front ends to the draft members 55 and 56 secured, respectively, to the members 28 and 29 of the hitch attachments D and E. The connecting links 53 and 54 provide means for restricting the lateral movement of the implement units within a given range when the vehicle is turned. In the construction described in Figures 1 and 4 it is thus seen that a triple hitch for grain drills, in which two grain drills are laterally trailed at the sides of the tractor and the center drills from the rear of the tractor, has been provided with rigid and flexibly mounted hitch attachment wherein as the tractor is steered to the right or the left, the grain drills follow in harmony with the movement of the tractor. The steering of the lateral grain drill B and C is accomplished so readily because the main axles of the grain drills substantially coincide and are parallel to the main axle of the tractor. In addition, the steering of the tractor is materially improved on account of the two wing drills or lateral drills being lined up with the tractor wheels which apparently on a short turn assist the tractor to turn with greater facility and also the hitch attachment directs the draft of the grain drills B and C so that the grain drills B and C will drill rows parallel to the direction in which the tractor is steered. The rear connected grain drill A is used to cover the space between the lateral or wing drills, or the space not sown by the lateral or wing drills B and C.

Figures 2 and 5 show the triple hitch attachment for grain drills attached to a tractor of the general purpose type. In these figures, the hitch attachment is applied to the tractor of the general purpose type 10' having the usual steering wheel and operator's station and also having the rear wheels 11', the front steering truck 12' having the dual wheels 13' and the draw-bar 14' attached to the downwardly extending rear axle housings. The grain drill A' is similar to the construction of the grain drill A previously described, and like parts will be denoted by prime reference characters. The grain drill A' is connected to the draw-bar 14' by the clevis 19'. Laterally positioned on the tractor are the hitch attachments D' and E', which are similar in construction to those described in Figures 1 and 4 and need not be described here, as the parts are similar and also the prime reference characters describe similar parts. In the construction shown in Figures 2 and 5, the axes of the grain drills B' and C' substantially coincide and lie in the same plane with the axis of the rear wheels 11' of the tractor 10'. In some instances it has been necessary to lengthen or decrease certain parts to have the grain drills B' and C' coincide with the axis of the rear wheels 11' of the tractor, but this is immaterial and does not need to be pointed out, as these changes may be made readily by any one familiar with the art. As shown in Figure 5, the parts 22' and 23', instead of being attached to the front steering truck 12', as are the parts 22 and 23, are attached to the front axle structure 12, as shown. Instead, these parts 22' and 23' are secured at their rear end to a laterally extending portion 57, which in turn is detachably mounted to the hanger brackets 58 and 59 secured to the side sills of the tractor 10'. However, in the construction shown in Figures 4 and 5, the parts 25 and 25' are rigidly secured to the tractor and are responsive to the movement of the tractor.

Figure 6:
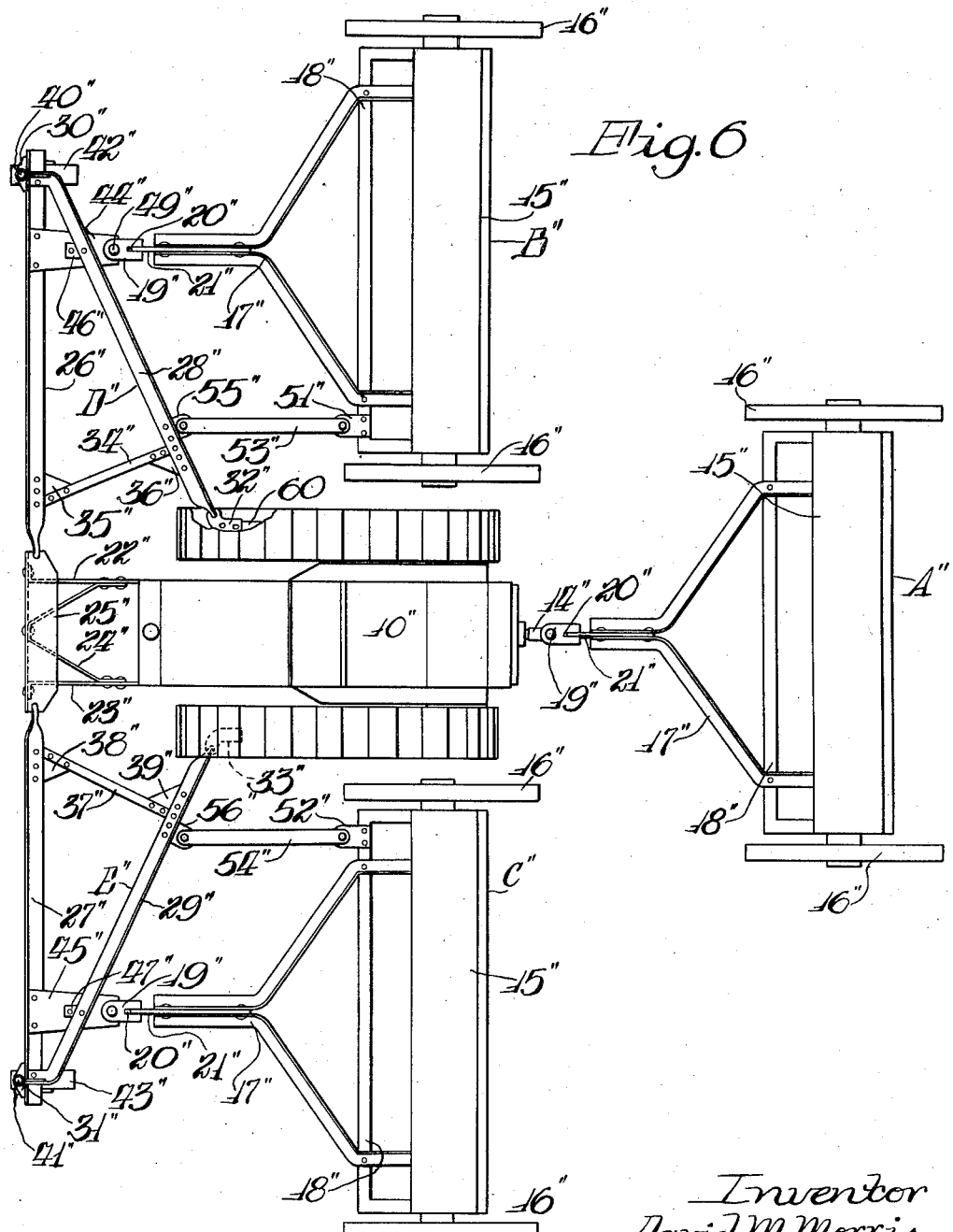

Figures 3 and 6 show the triple hitch attachment for grain drills attached to a tractor of the crawler type. In Figures 3 and 6, the tractor 10'' has the usual operator's station and steering mechanism and also has the usual crawler track rear drive sprockets 11'' corresponding to the rear drive wheels 11 and 11' of the previously described tractors, and also has the draft attachment 14'', to which the rear grain drill A'' is attached by the clevis strap 19. The grain drill A'' is similar to the grain drill A and A', and similar parts are represented by primed reference characters. Laterally secured at each side of the tractor 10' are the hitch attachments D'' and E''. These attachments D'' and E'' are similar to the attachments D, D', and E and E', previously described, and primed reference characters will describe similar parts. As these parts have been thoroughly described under Figures 1 and 4, they need be described here in only a general way. It is to be understood that certain members of the attachments D'' and E'' have been altered in general dimensions, but the principles of attaching the hitch attachments D'' and E'' are the same as have been previously described. In the construction, as shown in Figure 6, the axes of the wheels 16'' of the grain drills B'' and C'' substantially coincide and are parallel with the axis of the sprocket drive wheels 11'' for the crawler track. In a like manner, the members 22'' and 23'', which are similar in construction to the members 22 and 22' and 23 and 23', respectively, are secured to the forward frame of the tractor 10'', as best shown in Figure 6. The members 28'' and 29'' are flexibly mounted on brackets 32'' and 33'' which are secured to the crawler track frame structure 60 and 61. It is thus seen that a simple triple hitch attachment has been provided for a tractor of the crawler type in which the implements, as here described, in the nature of side connected grain drills readily follow the movements of the tractor as it is steered to the right or left.

It is thus evident from the disclosure that a suitable triple hitch attachment has been provided for tractors in the nature of the usual four-wheel type, the tricycle type, and the crawler type, in which the hitch attachment may be readily connected to and disconnected from these various types of tractors. It is also evident that the hitch attachment is flexibly mounted on the various types of tractors and provides a rigid wheel support for various implements that may be attached laterally on each side of the tractor. It is further evident that a suitable hitch attachment has been provided for the various types of tractors disclosed in which the laterally connected implements follow the movements of the tractor in whatever direction it is steered and whether the tractors are driven forward or reversed. In addition, if necessary, suitable trip ropes to operate the power lift, as disclosed in the above mentioned patent to S. W. Cady, may be operated from the operator's station on the tractor.

As will be obvious to those skilled in the art, other arrangements can be provided with the laterally connected hitch attachments which have been previously described where needed or desired or other forms of hitch attachments may be used; and, a wide range of utility is, therefore, attainable to meet any requirement arising in connection with the various implements which may be connected to the lateral hitch attachments and to the tractor. It is, therefore, understood that materials suitable to the stresses encountered in a hitch attachment of this nature are to be used.

The preferred embodiment of the invention hereindescribed is capable of certain modifications without departure from the scope of the invention to be defined in the following claims.

What is claimed is:

1. The combination with a self-propelled vehicle having driving axes, of a plurality of implement units laterally spaced with respect to said vehicle and having supporting wheels with the axis of said wheels coinciding substantially in the same vertical plane as the axis of said driving axles, transversely extending means flexibly supported on said vehicle for hitching said units to said vehicle whereby the implement units may have relative movement with respect to said vehicle, draft means on said implement units, and means attached to said implement units and to said transversely extending hitch means for limiting the lateral movement of said implement units so that said implement units will trail properly when turning with said vehicle.

2. The combination with a self-propelled vehicle having driving axles, of a plurality of implement units laterally spaced with respect to said vehicle and having supporting wheels with the axis of said wheels coinciding substantially in the same vertical plane as the axis of said driving axles, transversely extending means flexibly supported on said vehicle for hitching said implement units to said vehicle, draft means on said implement units for hitching said implement units to the transversely extending hitching means, and means on said draft means for adjusting the hitch point in a vertical plane.

3. The combination with a self-propelled vehicle having driving axles, of a plurality of implement units laterally spaced with respect to said vehicle and adapted for lateral movement, said implement units lying substantaiily in the same vertical plane as the axes of said driving axles, and means for hitching said implement units to said vehicle whereby the implement units may have movement relative to said vehicle, and means connecting said units and said hitching means whereby the lateral movement of said implement units is restricted within a given range when said vehicle is turned.

4. The combination with a self-propelled vehicle having driving axles, of a hitch attachment for attaching a plurality of implement units to said vehicle, two of said units attached to said attachment whereby said units are laterally spaced with respect to said vehicle and having the units lying substantially in the same vertical plane as the axis of said driving axles, means on said hitch attachment for hitching said laterally spaced units to the vehicle whereby the implement units may have movement relative to said vehicle, and means for pivotally connecting a centrally located implement unit to said vehicle to trail in the space between the inner ends of the laterally spaced implements.

5. The combination with a self-propelled vehicle having driving axles, of a hitch attachment for attaching a plurality of implement units to said vehicle, two of said units attached to said attachment whereby said units are laterally spaced with respect to said vehicle and having the units lying substantially in the same vertical plane as the axis of said driving axles, means on said hitch attachment for connecting said attachment to said vehicle whereby said attachment is provided with a movement transversely with respect to said vehicle, and means for pivotally connecting a centrally located implement unit to said vehicle to trail in the space between the inner ends of the laterally spaced implements.

6. The combination with a self-propelled vehicle having a frame, driving wheels and a front steering truck having a transverse axle member, of a plurality of implement units laterally spaced with respect to said vehicle, said implement units having wheels, the axes of which coincide substantially in the same vertical plane as the axis of the driving wheels, a forwardly extending supporting member secured to said axle member, a plurality of transversely extending hitching members laterally positioned on each side of said vehicle, means for flexibly securing said hitch members to said forwardly extending supporting member and to said vehicle frame, draft means for connecting said implement units to said hitching members, and means for connecting said implement units and said hitching members, whereby the lateral movement of said implement units will be limited when said vehicle is turned.

7. The combination with a self-propelled vehicle of the tricycle type having a narrow longitudinally extending frame, of a plurality of implement units laterally spaced with respect to the traction wheels thereof the axes of which coincide substantially in the same vertical plane as the axis of the traction wheels, a forwardly extending supporting member secured to said longitudinally extending frame, a plurality of transversely extending hitching members laterally positioned on each side of said vehicle, means for flexibly securing said hitch members to said forwardly extending supporting member and to the aforesaid frame, draft means for connecting said implement units to said hitching members, and means for connecting said implement units and said hitching members, whereby the lateral movement of said implement units will be limited when said vehicle is turned.

8. The combination with a self-propelled vehicle of the endless track type having an engine supporting frame, a track frame and driving sprockets for said track, of a plurality of implement units having wheels the axes of which coincide substantially in the same vertical plane as the axis of the driving sprockets, a forwardly extending supporting member secured to said engine supporting frame, a plurality of transversely extending hitching members laterally positioned on each side of said vehicle, means for flexibly securing said hitch members to said forwardly extending supporting member and to the aforesaid engine frame, draft means for connecting said implement units to said hitching members, and means for connecting said implement units and said hitching members, whereby the lateral movements of said implement units will be limited when said vehicle is turned.

9. In a hitching attachment for self-propelled vehicles for trailing an implement unit laterally of said vehicle, said attachment comprising a plurality of transversely extending hitching members, means for flexibly connecting said hitching members at longitudinally spaced points on said vehicle, transporting means secured to said hitching members for supporting said hitching members vertically with respect to said vehicle, draft means for connecting said implement unit to said hitching members, and means for connecting said implement unit to said attachment whereby the lateral movement of said implement unit will be limited.

DAVID M. MORRIS.